United States Patent Office 3,371,100
Patented Feb. 27, 1968

3,371,100
CHROMANYL OR DIHYDROBENZOFURANYL SUBSTITUTED ALKYLAMINOETHANOLS
Ralph Howe, Macclesfield, England, assignor to Imperial Chemical Industries Limited, London, England, a corporation of Great Britain
No Drawing. Filed Jan. 5, 1965, Ser. No. 423,594
Claims priority, application Great Britain, Jan. 24, 1964, 3,201/64
6 Claims. (Cl. 260—345.2)

ABSTRACT OF THE DISCLOSURE

Amine derivatives possessing β-adrenergic blocking activity selected from compounds of the formula:

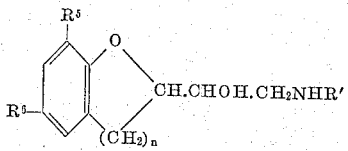

where R' is hydrogen, alkyl of 2–5 carbons, or alkyl of 2–5 carbons containing one or more specific substituents, e.g. hydroxy; $n$ is 1 or 2; $R^5$ and $R^6$ are hydrogen, chlorine or bromine; esters of these compounds with carboxylic acids of the formula $R^2.COOH$ where $R^2$ is alkyl of 1–3 carbons or aryl of 6–10 carbons and the non-toxic acid addition salts. Various procedures for preparing these compounds are also disclosed as well as compositions containing same for use in the treatment or prophylaxis of heart disease.

---

This invention relates to new amine derivatives which possess β-adrenergic blocking activity and which are therefore useful in the treatment or prophylaxis of heart diseases.

According to the invention we provide amine derivatives of the formula:

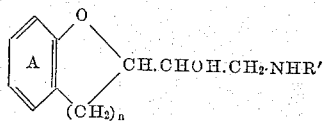

wherein $R^1$ stands for hydrogen or for an alkyl radical of at least 2 carbon atoms, optionally substituted by one or more radicals selected from the group consisting of hydroxy, alkoxy, aryloxy, aryl or substituted aryloxy or aryl radicals, wherein $n$ stands for 1 or 2 and wherein the benzene ring A may optionally bear one or more halogen substituents, and the esters thereof, and the acid-addition salts thereof.

It is to be understood that the abve definition encompasses all the possible stereoisomeric forms of the said amine derivatives, or mixtures thereof.

As a suitable value for $R^1$ when it stands for an alkyl radical, there may be mentioned, for example, an alkyl radical of at least 2 and not more than 5 carbon atoms, for example the ethyl, n-propyl, isopropyl, n-butyl, isobutyl, s-butyl, t-butyl or 1,1-dimethylpropyl radical. As suitable values for the optional substituent in the alkyl radical $R^1$ there may be mentioned alkoxy radicals of not more than 3 carbon atoms, for example the methoxy radical, or aryloxy or aryl radicals of not more than 10 carbon atoms, optionally substituted, for example phenoxy or phenyl radicals, optionally substituted by, for example, one or more halogen atoms, for example chlorine atoms, or one or more alkoxy radicals, for example alkoxy radicals of not more than 3 carbon atoms, for example methoxy radicals, or one or more hydroxy radicals. Thus, specific values for $R^1$ when it stands for a substituted alkyl radical are, for example, 2-hydroxy-1,1-dimethylethyl,
3-methoxypropyl-1,1-dimethyl-2-phenoxyethyl,
1-methyl-3-phenylpropyl,
1,1-dimethyl-3-phenylpropyl,
2-hydroxy-1-methyl-2-phenylethyl, or
3-(p-chlorophenyl)-1,1-dimethylpropyl radical.

As suitable optional halogen substituents in the benzene ring A there may be mentioned, for example, chlorine or bromine atoms.

Particularly valuable amine derivatives of the invention are, for example, 1-(2-chromanyl)-2-t-butylaminoethanol,
1-(2-chromanyl)-2-isopropylaminoethanol and
1-(2,3-dihydrobenzofuran-2-yl)-2-isopropylaminoethanol, and the esters thereof, and the acid-addition salts thereof.
As suitable esters of the said amine derivatives there may be mentioned, for example O-esters derived from carboxylic acids of the formula $R^2.COOH$ wherein $R^2$ stands for an alkyl or aryl radical, for example an alkyl radical of not more than 3 carbon atoms, or an aryl radical of not more than 10 carbon atoms, for example the methyl or phenyl radical.

As suitable acid-addition salts of the amine derivatives of the invention there may be mentioned, for example, salts derived from inorganic acids, for example hydrochlorides, hydrobromides, phosphates or sulphates, or salts derived from organic acids, for example oxalates, lactates, tartrates, acetates, salicylates, citrates, benzoates, naphthoates, o-acetoxybenzoates, adipates, maleates or 1,1'-methylene-bis-2-hydroxy-3-naphthoates, or salts with acidic synthetic resins, for example sulphonated polystyrene resins, for example "Zeo-Karb" 225 ("Zeo-Karb" is a trademark). Relatively insoluble salts, for example the 1,1'-methylene-bis-2-hydroxy-3-naphthoates, are useful in that they afford prolonged blood levels of the medicament.

According to a further feature of the invention we provide a process for the manufacture of the amine derivatives of the invention which comprises the interaction of a compound of the formula:

wherein R stands for the radical

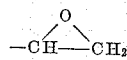

or the radical —CHOH CH$_2$X, wherein X stands for a halogen atom, wherein $n$ stands for 1 or 2 and wherein the benzene ring A may optionally bear one or more halogen substituents, with an amine of the formula NH$_2$R$^1$, wherein R$^1$ has the meaning stated above.

As a suitable value for X there may be mentioned, for example, a chlorine or bromine atom. The said interaction may be carried out in a diluent or solvent for example ethanol, and it may conveniently be accelerated or completed by the application of heat.

According to a further feature of the invention we provide a process for the manufacture of those of the amine derivatives of the invention wherein R$^1$ stands for a radical of the formula —CHR$^3$R$^4$, wherein R$^3$ stands for hydrogen or an alkyl radical, and R$^4$ stands for an alkyl radical, optionally substituted by one or more radicals selected from the group consisting of hydroxy, alkoxy, aryloxy, aryl or substituted aryloxy or aryl radicals, or fore an aryl or substituted aryl radical, which comprises the interaction of a primary amine of the formula:

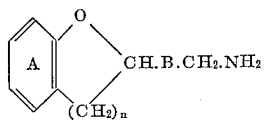

wherein B stands for the group —CO— or —CHOH—, wherein n stands for 1 or 2 and wherein the benzene ring A may optionally bear one or more halogen substituents, with a carbonyl compound of the formula $R^3 \cdot CO \cdot R^4$, wherein $R^3$ and $R^4$ have the meanings stated above, under reducing conditions.

Suitable reducing conditions are those provided by hydrogen in the presence of a hydrogenation catalyst, for example platinum, in a diluent or solvent, for example ethanol. In the case where, in the said carbonyl compound used as starting material, $R^3$ stands for an alkyl radical, an excess of the carbonyl compound use as starting material may be present as diluent or solvent or the said excess of the carbonyl compound may be present in addition to a diluent or solvent. Suitable alternative reducing conditions are those provided by an alkali metal borohydride, for example sodium borohydride, in an inert diluent or solvent, for example aqueous methanol. An excess of the carbonyl compound used as starting material may be present as diluent or solvent or the said excess of the carbonyl compound may be present in addition to a diluent or solvent. It is to be understood that the said primary amine used as starting material may be generated in situ, for example by reduction of the corresponding α-diazoketone, α-azido-ketone and -alcohol, α-hydroxyiminoketone, α-nitro-ketone and -alcohol, cyanhydrin or acyl cyanide.

According to a further feature of the invention we provide a process for the manufacture of the amine derivatives of the invention, which comprises the reduction of a compound of the formula:

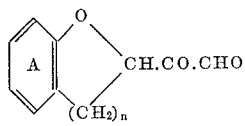

or the hydrate thereof, wherein n stands for 1 or 2 and wherein the benzene nucleus A may optionally bear one or more halogen substituents, in the presence of an amine of the formula $NH_2R^1$, wherein $R^1$ has the meaning stated above, or an acid-addition salt thereof.

Suitable reducing conditions for the last-named reduction are those provided by hydrogen in the presence of a hydrogenation cataylst, for example platinum. The catalytic hydrogenation may be carried out in an inert diluent or solvent, for example ethanol. The catalytic hydrogenation may be carried out at atmospheric pressure or at elevated pressure, and it may be carried out at ambient temperature or at an elevated temperature. Suitable alternative reducing conditions are those provided by a metal hydride, for example sodium borohydride, in a diluent or solvent, for example methanol or ethanol, at a temperature of between 0–25 C.

According to a further feature of the invention we provide a process for the manufacture of those of the amine derivatives of the invention which have the formula:

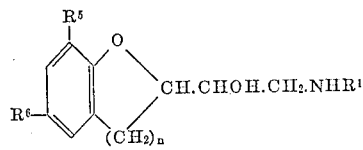

wherein $R^1$ and n have the meanings stated above and wherein of $R^5$ and $R^6$, one stands for a halogen atom and the other stands for hydrogen or for a halogen atom, and the acid-addition salts thereof, which comprises the interaction of the corresponding amine derivative wherein of $R^5$ and $R^6$, one stands for hydrogen and the other stands for hydrogen or fore a halogen atom, or an acid-addition salt thereof, with a halogenating agent.

Suitable halogenating agents are, for example, chlorine or bromine. The halogenation may be effected in an inert diluent or solvent, for example acetic acid, and it may be carried out at ambient temperature or at an elevated temperature.

According to a further feature of the invention we provide a a process for the manufacture of the esters of the amine derivatives of the invention which comprises the 0-acylation of an acid-addition salt of the corresponding amine derivative. As suitable acylating agents there may be mentioned, for example, acyl halides or acid anhydrides, for example acetyl chloride, acetic anhydride or benzoyl chloride. The acylation may be carried out in a diluent or solvent, which, in the case where an acid anhydride is used, may conveniently be the acid from which the anhydride is derived.

The amine derivatives of the invention possess β-adrenergic blocking activity and are therefore useful in the treatment or prophylaxis of heart diseases, for example agina pectoris and cardiac arrhythmias, and in the treatment of hypertension and phaeochromocytoma.

According to a further feature of the invention therefore, we provide pharmaceutical compositions containing as active ingredient an amine derivative of the invention, or an ester thereof, or an acid-addition salt thereof, in admixture with a pharmaceutically-acceptable diluent or carrier therefor.

The pharmaceutical compositions of the invention may be in the form of tablets, capsules, aqueous or oily solutions, aqueous or oily suspensions, emulsions, injectable aqueous or oily solutions or suspensions, or dispersible powders.

Suitable tablets may be formulated by admixture of the active ingredient with known pharmaceutical excipients, for example inert diluents, for example calcium carbonate, calcium phosphate or lactose, distintegrating agents, for example maize starch or alginic acid, binding agents, for example starch, gelatin or acacia mucilage, and lubricating agents, for example magnesium stearate, stearic acid or talc. Such tablets may optionally by coated by known techniques in order to delay distintegration in the stomach and thus to provide a sustained action over an extended period.

The aqueous suspensions, emulsions, oily solutions and suspensions of the invention generally contain a sweetening gent, for example glycerol, dextrose or sucrose, and a flavouring agent, for example vanillin or orange extract, in order to provide a palatable product. The aqueous suspensions of the invention may also contain suitable suspending or thickening agents, for example sodium carboxymethylcellulose, wetting agents, for example condensation products of fatty alcohols with ethylene oxide, and suitable preservatives, for example methyl or propyl-p-hydroxybenzoate.

The emulsion compositions of the invention may contain the active ingredient dissolved in a suitable fat of vegetable or animal origin, for example arachis oil or cod liver oil, and may also contain sweetening agents and flavouring agents which may with advantage be essential oils. The said emulsions may also contain emulsifying agents and dispersing agents, for example soya bean lecithin, polyoxyethylene sorbitan mono-oleate, gum acacia, gum tragacanth or casein, and preservatives, for example methyl or propyl p-hydroxybenzoate, and anti-oxidants, for example propyl gallate.

The oily solutions of the invention likewise may contain the active ingredient in solution in a suitable fat of vegetable or animal origin, and may optionally contain flavouring agents to mask the taste and improve oral acceptability. Such oily solutions may advantageously be filled into soft geltain capsules. The oily solutions may also contain sweetening agents, for example icing sugar, in which case the oil phase may in addition contain a suspending agent, for example beeswax, to maintain the redispersion properties of the suspension.

Oral compositions in the form of capsules may consist of capsules, for example gelatine capsules, containing active ingredient only or the capsule may contain the active ingredient in admixture with inert diluents, for example lactose or sorbitol.

The sterile injectable aqueous suspensions of the invention may contain a suspending or thickening agent, for example sodium carboxymethylcellulose, and a wetting or dispersing agent, for example a phenol-polyethylene oxide condensate, for example the condensation product of octylcresol with about 8–10 molecular proportions of ethylene oxide. The injectable oily solutions of the invention may be prepared from a non-toxic injectable fat or oil, for example arachis oil or ethyl oleate, and they may additionally contain gelling agents, for example aluminum stearate, to delay absorption within the body. These aqueous and oily injectable preparations may contain preservatives such as methyl or n-propyl p-hydroxybenzoate or chlorobutanol.

The invention is illustrated but not limited by the following examples in which the parts are by weight:

*Example 1*

A mixture of 1 part of 2-chloro-1-(2-chromanyl)ethanol, 8 parts of t-butylamine and 15 parts of ethanol is heated in a sealed vessel at 100° C. for 10 hours and the ethanol and the excess of t-butylamine are then removed by evaporation under reduced pressure. The residual gum is shaken with a mixture of 25 parts of 0.5 N-hydrochloric acid and 20 parts of ether. The resulting mixture is separated, the ethereal layer is discarded and 5 parts of 8 N-aqueous sodium hydroxide solution are added to the acidic aqueous phase. The mixture thus obtained is extracted with 60 parts of ether in three equal portions and the combined ethereal extracts are then washed with 20 parts of water in two equal portions. The ethereal extract is dried with anhydrous magnesium sulphate and ethereal hydrogen chloride solution is then added until the separation of solid is substantially complete. The mixture is filtered and the solid residue is fractionally crystallised from a mixture of methanol and ethyl acetate.

There is thus obtained as the less soluble component of the solid residue a substantially pure isomer of 1-(2-chromanyl)-2-t-butylaminoethanol hydrochloride, M.P. 235–237° C., and as the more soluble component of the solid residue a substantially pure second isomer of 1-(2-chromanyl)-2-t-butylaminoethanol hydrochloride, M.P. 190–192° C.

Purification of these substantially pure isomers may be carried out as follows:

1 part of 1-(2-chromanyl)-2-t-butylaminoethanol hydrochloride, M.P. 235–237° C., is shaken with a mixture of 25 parts of 2 N-sodium hydroxide solution and 50 parts of ether until the solid hydrochloride has completely dissolved. The ethereal layer is separated, washed twice with 10 parts of water each time, dried with anhydrous magnesium sulphate and then evaporated to dryness. The residue thus obtained is crystallised from light petroleum (B.P. 40–60° C.) and there is thus obtained a pure isomer of 1-(2-chromanyl)-2-t-butylaminoethanol as the free base, M.P. 108–109° C., which is characterised (in liquid paraffin by an absorption band at 1062 cm.$^{-1}$ and by the absence of an absorption band at 1052 cm.$^{-1}$.

1 part of the said isomer as the free base, M.P. 108–109° C., is dissolved in 25 parts of ether and ethereal hydrogen chloride is added until the separation of solid is substantially complete. The mixture is filtered and the solid residue is crystallised from a mixture of methanol and ethyl acetate. The said isomer is thus obtained as its hydrochloride, M.P. 248–249° C.

The substantially pure second isomer of 1-(2-chromanyl)-2-t-butylaminoethanol hydrochloride, M.P. 190–192° C., is converted to the corresponding free base by the procedure described above and the free base is then crystallised from light petroleum (B.P. 60–80° C.). There is thus obtained a pure second isomer of 1-(2-chromanyl)-2-t-butylaminoethanol as the free base, M.P. 112–113° C., which is characterised (in liquid paraffin) by an absorption band at 1052 cm.$^{-1}$ and by the absence of a band at 1062 cm.$^{-1}$. The pure second isomer as the free base, M.P. 112–113° C., is converted into its hydrochloride, M.P. 193–194° C., by the procedure described above.

The 2-chloro-1-(2-chromanyl)ethanol used as starting material may be obtained as follows:

A mixture of 10 parts of chroman-2-carboxylic acid and 24 parts of oxalyl chloride are kept at ambient temperature for 24 hours and then the excess of oxalyl chloride is then removed by evaporation. The residual oil is dissolved in 20 parts of benzene and the solution is evaporated to dryness. The residual oil consists of 2-chromanylcarbonyl chloride.

A solution of 10 parts of 2-chromanylcarbonyl chloride in 30 parts of ether is added to an excess of ethereal diazomethane at 0° C. The solution is kept at 0° C. for 18 hours and the ether and excess of diazomethane are then evaporated. The residual oil consists of 2-diazoacetylchroman.

Hydrogen chloride is passed into a solution of 10 parts of 2-diazoacetylchroman in 300 parts of ether at 0° C. until a slight excess of hydrogen chloride is present. Ice is added cautiously until the initial vigorous reaction has subsided and the ethereal solution is then washed successively with 300 parts of water in three equal portions, 300 parts of 10% aqueous sodium carbonate solution in three equal portions and finally with 150 parts of water in three equal portions. The ethereal solution is then dried with anhydrous magnesium sulphate and the ether is evaporated. The residual oil consists of 2-chloroacetylchroman.

2 parts of sodium borohydride are added during 1 hour to a stirred solution of 5 parts of 2-chloroacetylchroman in 80 parts of methanol at 0° C. The mixture is stirred at ambient temperature for 16 hours and the methanol is then removed by evaporation under reduced pressure. The residual gum is shaken with 80 parts of ether and the ethereal solution is washed with 40 parts of water in two equal portions. The ethereal solution is dried with anhydrous magnesium sulphate and the ether is then removed by evaporation. The residual oil consists of 2-chloro-1-(2-chromanyl)ethanol.

*Example 2*

The process of the first part of Example 1 is repeated using 7 parts of isopropylamine in place of 8 parts of t-butylamine. There is thus obtained 1-(2-chromanyl)-2-isopropylaminoethanol hydrochloride, M.P. 171–173° C.

*Example 3*

A mixture of 0.2 part of 1-(2-chromanyl)-2-t-butylaminoethanol hydrochloride, M.P. 235–237° C., and 45 parts of acetyl chloride is heated under reflux for 18 hours and the excess of acetyl chloride is then removed by evaporation. The residual gum is stirred with 5 parts of ether until the separation of solid is substantially complete. The mixture is filtered and the residual solid is crystallised from a mixture of methanol and ethyl acetate. There is thus obtained 1-(2-chromanyl)-2-t-butylaminoethyl acetate hydrochloride, M.P. 218–220° C.

*Example 4*

A solution of 0.2 part of bromine in 25 parts of acetic acid is added to a solution of 0.4 part of 1-(2-chromanyl)-2-t-butylaminoethanol hydrochloride, M.P. 193–194° C., in 25 parts of acetic acid. The mixture is heated to 40° C. and kept at that temperature until the colour of the bromine has largely been discharged. After a further 1 hour the acetic acid is removed by evaporation under reduced pressure. The residual gum is dissolved in 10 parts of water, 5 parts of 8 N-sodium hydroxide solution are added and the mixture is extracted twice with 50 parts of ether each time. The ethereal extracts are combined and washed three times with 20 parts of water each time, dried with anhydrous magnesium sulphate and the ether is then removed by evaporation. The residual solid is crystallised from light petroleum (B.P. 40–60° C.) and there is thus obtained 1 - (6 - bromo - 2 - chromanyl) - 2 - t-butylaminoethanol, M.P. 108–110° C.

*Example 5*

The process described in the first part of Example 1 is repeated except that 2 parts of 2-bromo-1-(2-chromanyl)ethanol, 1.35 parts of 2-amino-2-methyl-1-propanol and 12 parts of ethanol are used as starting materials. The product is isloated substantially as described in the first part of Example 1, except that the dried ethereal extract is not treated with ethereal hydrogen chloride solution, but is evaporated to dryness. The residue is crystallised from ethyl acetate and there is thus obtained 1-(2-chromanyl) - 2 - (1,1 - dimethyl - 2 - hydroxyethylamino)ethanol, M.P. 146–147° C.

The 2-bromo-1-(2-chromanyl)ethanol used as starting material may be obtained as follows:

A solution of 16.5 parts of 2-diazoacetylchroman in 200 parts of ether is shaken carefully ten times with 30 parts of constant boiling hydrobromic acid each time, nitrogen being evolved during this process. The ethereal layer is washed three times with 100 parts of water each time, once with 50 parts of 10% aqueous sodium carbonate solution and finally twice with 50 parts of water each time. The ethereal solution is dried with anhydrous magnesium sulphate and the ether is removed by evaporation. The residual oil consists of 2-bromoacetylchroman.

3 parts of sodium borohydride are added during 1 hour at 0° C. to a stirred solution of 5 parts of 2-bromoacetylchroman in 40 parts of methanol. The mixture is stirred at ambient tempreature for 16 hours and the methanol is then removed by evaporation under reduced pressure. The residual gum is shaken with 60 parts of ether and the ethereal solution is washed with 90 parts of water in three equal portions, dried with anhydrous magnesium sulphate and the ether is then removed by evaporation. The residual oil consists of 2-bromo-1-(2-chromanyl)ethanol.

*Example 6*

The process described in the first part of Example 1 is repeated except that 1 part of 2-bromo-1-(2-chromanyl)ethanol, 0.74 part of 3-methoxypropylamine and 12 parts of ethanol are used as starting materials. The product is isolated substantially as described in the first part of Example 1 and there is thus abtained 1-(2-chromanyl)-2-(3 - methoxypropylamino)ethanol hydrochloride, M.P. 129–130° C.

*Example 7*

A mixture of 0.81 part of 2-bromo-1-(2-chromanyl)ethanol, 0.97 part of norephedrine and 12 parts of ethanol is heated in a sealed vessel at 100° C. for 10 hours and the ethanol is then removed by evaporation under reduced pressure. The residual gum is shaken with 50 parts of N-hydrochloric acid and 40 parts of chloroform. The acidic aqueous layer is separated and extracted again with 40 parts of chloroform. The two chloroform extracts are combined, washed twice with 20 parts of water each time, dried over anhydrous magnesium sulphate, and the chloroform is then removed by evaporation. The residual gum is shaken with 50 parts of N-sodium hydroxide solution and 20 parts of ether. The aqueous layer is separated and extracted twice more with 20 parts of ether each time. The ethereal extracts are combined, washed twice with 20 parts of water each time, dried over anhydrous magnesium sulphate and the ether is then removed by evaporation. 0.75 part of the residual oil thus obtained is dissolved in 8 parts of acetone and a solution of 0.21 part of anhydrous oxalic acid in 4 parts of acetone is added. When the separation of solid is substantially complete the mixture is filtered and the solid residue is crystallised from a mixture of methanol and ethyl acetate. There is thus obtained 1-(2-chromanyl)-2-(2-hydroxy-1-methyl-2-phenylethylamino)ethanol hydrogen oxalate, M.P. 185–187° C.

*Example 8*

The process described in the first part of Example 1 is repeated except that 3 parts of 2-bromo-1-(2-chromanyl)ethanol, 10 parts of liquid ammonia and 8 parts of ethanol are used as starting materials. The produce is isolated substantially as described in the first part of Example 1. There is thus obtained 2-amino-1-(2-chromanyl)ethanol hydrochloride, M.P. 226–228° C.

*Example 9*

0.1 part of sodium borohydride is added at 0° C. during 15 minutes to a stirred solution of 0.1 part of 2-amino-1-(2-chromanyl)ethanol in a mixture of 16 parts of methanol and 2 parts of acetone. The solution is stirred for 16 hours at ambient temperature, and the methanol and excess acetone are then removed by evaporation under reduced pressure. The product is isolated substantially as described in the first part of Example 1, and there is thus obtained 1-(2-chromanyl)-2-isopropylaminoethanol hydrochloride, M.P. 175–176° C.

The 2-amino-1-(2-chromanyl)ethanol used as starting material may be obtained by conventional methods from the corresponding hydrochloride described in Example 8.

*Example 10*

The process described in the first part of Example 1 is repeated except that 1 part of 2-chloro-1(2,3-dihydrobenzofuran-2-yl)ethanol, 10 parts of isopropylamine and 10 parts of ethanol are used as starting material. The product is isolated substantially as described in the first part of Example 1, except that the dried etheral extract is not treated with etheral hydrogen chloride solution, but is evaporated to dryness. The solid residue is fractionally crystallised from petroleum ether (B.P. 80–100° C.) and then from petroleum ether (B.P. 60–80° C.). There is thus obtained as the less soluble component of the solid residue one isomeric form of 1-(2,3-dihydrobenzofuran-2-yl)-2-isopropylaminoethanol M.P. 116–118° C., and as the more soluble component of the solid residue a second isomeric form of 1-(2,3-dihydrobenzofuran-2-yl)-2-isopropylaminoethanol, M.P. 85–86.5° C.

The 2-chloro - 1 - (2,3-dihydrobenzofuran-2-yl)ethanol used as starting material may be obtained as follows:

A solution of 13 parts of 2-chlorocarbonyl-2,3-dihydrobenzofuran in 50 parts of dry ether is added to an excess of a solution of diazomethane in 1500 parts of dry ether at 0° C. The rate of addition is controlled to keep the temperature at 0° C. The mixture is allowed to stand overnight and the excess of diazomethane is then removed by distillation with ether. The solution is evaporated to dryness, and there is thus obtained 2-diazoacetyl-2,3-dihydrobenzofuran as an oil.

Dry hydrogen chloride is passed through a solution of 13 parts of 2-diazoacetyl-2,3-dihydrobenzofuran in 500 parts of dry ether for 2½ hours at 0–5° C. The ethereal solution is washed with 200 parts of water, 200 parts of 5% aqueous sodium carbonate solution, and again with 200 parts of water. The ethereal solution is then dried with anhydrous magnesium sulphate and evaporated to dryness. The solid residue is crystallised from petroleum ether (B.P. 40–60° C.) and there is thus obtained 2-chloroacetyl-2,3-dihydrobenzofuran, M.P. 56.5–57.5° C.

0.2 part of sodium borohydride is added to a mixture of 1,96 parts of 2-chloroacetyl-2,3-dihydrobenzofuran and 20 parts of methanol cooled to 0° C., and the mixture is stirred for 2 hours at 0° C. An excess of 2 N-hydrochloric acid is added and the mixture is evaporated to a small volume to remove the methanol. 30 parts of water are added and the mixture is extracted three times with 30 parts of ether each time. The ethereal solution is dried with anhydrous magnesium sulphate and then evaporated to dryness. There is thus obtained 2-chloro-1-(2,3-dihydrobenzofuran-2-yl)ethanol as an oil.

*Example 11*

The process described in Example 7 is repeated except that 0.5 part of 2-bromo-1-(2-chromanyl)ethanol, 0.8 part of 3-(p-chlorophenyl) - 1,1 - dimethylpropylamine and 12 parts of ethanol are used as starting materials. The produce is isolated substantially as described in Example 7 except that the residue after evaporation of the chloroform solution is stirred with 5 parts of ether until the separation of solid is substantially complete. The mixture is filtered and the solid residue is crystallised from a mixture of methanol and ethyl acetate. There is thus obtained 2-[3-(p-chlorophenyl)-1,1-dimethylpropylamino]-1 - (2 - chromanyl)ethanol hydrochloride hemihydrate, M.P. 153–155° C.

*Example 12*

The process described in Example 1 is repeated except that 1.6 parts of 2-bromo-1-(2-chromanyl)ethanol, 2 parts of 1,1-dimethyl-2-phenoxyethylamine and 12 parts of ethanol are used as starting materials. The product is isolated substantially as described in Example 1 and there is thus obtained 1-(2-chromanyl)-2-(1,1-dimethyl-2-phenoxyethylamino)ethanol hydrochloride hemihydrate, M.P. 116–117° C.

*Example 13*

The process described in Example 7 is repeated except that 1 part of 2-chloro-1-(2-chromanyl)ethanol, 0.7 part of 1-methyl-3-phenylpropylamine and 25 parts of ethanol are used as starting materials. The product is isolated substantially as described in Example 7 except that the residue after evaporation of the chloroform solution is dissolved in 20 parts of hot ethyl acetate and the solution is allowed to cool. When the separation of solid is substantially complete, the mixture is filtered and the solid residue is crystallised from a mixture of methanol and ethyl acetate. There is thus obtained 1-(2-chromanyl)-2-(1-methyl-3 - phenylpropylamino)ethanol hydrochloride, M.P. 192–194° C.

*Example 14*

1 part of sodium borohydride is added at 0° C. during 30 minutes to a stirred solution of 0.4 part of 2-chromanylglyoxal hydrate and 8 parts of t-butylamine in 40 parts of methanol. The solution is stirred at ambient temperature for 16 hours and the methanol and excess t-butylamine are then removed by evaporation under reduced pressure. The product is isolated substantially as described in the first part of Example 1, and there is thus obtained as the less soluble component of the solid residue one substantially pure isomer of 1-(2-chromanyl)-2-t-butylaminoethanol hydrochloride, M.P. 235–237° C.

The 2-chromanylglyoxal hydrate used as starting material may be obtained as follows:

A solution of 0.5 part of 2-bromoacetylchroman in 5 parts of dimethyl sulphoxide is kept at ambient temperature for one week and then poured into 200 parts of water at 5° C. with stirring. The mixture is extracted with 100 parts of ether in two equal portions, the ethereal extracts are combined, washed with 20 parts of water, dried over anhydrous magnesium sulphate and the ether is then removed by evaporation. The residual gum thus obtained consists of 2-chromanylglyoxal hydrate.

*Example 15*

0.2 part of Adams' catalyst and 25 parts of ethanol are shaken in an atmosphere of hydrogen at ambient temperature and atmospheric pressure until the absorption of hydrogen ceases. 1 part of 2-diazoacetylchroman and 15 parts of acetone are added and the mixture is shaken in an atmosphere of hydrogen at ambient temperature and atmospheric pressure for 24 hours. The mixture is filtered and the ethanol and excess of acetone are removed from the filtrate by evaporation. The product is isolated substantially as described in the first part of Example 1, and there is thus obtained 1-(2-chromanyl)-2-isopropylaminoethanol hydrochloride, M.P. 171–172° C.

*Example 16*

A mixture of 50 parts of 1-(2-chromanyl)-2-t-butylaminoethanol (M.P. 108–109° C.), 125 parts of maize starch, 270 parts of calcium phosphate and 1 part of magnesium stearate is compressed, and the compressed mixture is then broken down into granules by passage through a 16-mesh screen. The resultant granules are then compressed into tablets according to the known art. There are thus obtained tablets suitable for therapeutic purposes.

The 50 parts of 1-(2-chromanyl)-2-t-butylaminoethanol are replaced by 50 parts of 1-(2,3-dihydrobenzofuran-2-yl)-2-isopropylaminoethanol (M.P. 116–118° C.) and there are thus obtained, in similar manner, tablets suitable for therapeutic purposes.

*Example 17*

A mixture of 100 parts of 1-(2-chromanyl)-2-t-butylaminoethanol hydrochloride (M.P. 248–249° C.) and 80 parts of mannitol is passed through a 60-mesh screen. Sufficient of a 10% aqueous solution of gelatin is then added to make a stiff paste. The paste is passed through a 16-mesh screen, dried at 60° C. and then passed through a 20-mesh screen. To the resultant granules are added 6 parts of alginic acid and 2 parts of magnesium stearate. The resultant mixture is compressed into tablets according to the known art. There are thus obtained tablets suitable for therapeutic purposes.

The 1-(2-chromanyl)-2-butylaminoethanol hydrochloride is replaced by an equal quantity of 1-(2-chromanyl)-2-isopropylaminoethanol hydrochloride or 1-(2,3-dihydrobenzofuran-2-yl)-2-isopropylaminoethanol hydrochloride (prepared from the free base M.P. 116–118° C. by conventional methods) and there are thus obtained, in similar manner, tablets suitable for therapeutic purposes.

*Example 18*

200 parts of coconut oil, 780 parts of arachis oil, and 20 parts of beeswax are melted together at a temperature not exceeding 100° C., and 0.75 part of propyl gallate is then added and dissolved by stirring. The oily solution is allowed to cool to ambient temperature with continual stirring. 4 parts of 1-(2-chromanly)-2-t-butylaminoethanol hydrochloride (M.P. 248–249° C.), 40 parts of icing sugar and 0.6 part of saccharin sodium are mixed together for 10 minutes, and 55 parts of the above mixed oily solution are added slowly with continual stirring. A suitable flavouring agent is added, and mixing is continued for 30 minutes. There is thus obtained an oily suspension suitable for oral administration for therapeutic purposes.

*Example 19*

A solution of 1 part of 1-(2-chromanyl)-2-t-butylaminoethanol hydrochloride (M.P. 248–249° C.) in 100 parts of distilled water is filled into ampoules. The ampoules are sealed and then heated at 115° C. for 30 minutes There are thus obtained ampoules containing a sterile aqueous solution suitable for parenteral administration for therapeutic purposes.

The above process is repeated except that a solution of 0.1 part of sodium metabisulphite and 1 part of 1-(2-chromanyl)-2-t-butylaminoethanol hydrochloride (M.P. 248–249° C.) in 100 parts of distilled water is filled into ampoules and then treated as described above. There are thus obtained ampoules containing a sterile aqueous solution suitable for parenteral administration for therapeutic purposes.

*Example 20*

A solution of 1 part of 1-(2-chromanyl)-2-t-butylaminoethanol hydrochloride (M.P. 248–249° C.) in 100 parts of distilled water is passed through a sterilising filter. The sterile filtrate is filled into sterile ampoules under aseptic conditions. There are thus obtained ampoules containing a sterile aqueous solution suitable for parenteral administration for therapeutic purposes.

*Example 21*

A mixture of 5 parts of 1-(2-chromanyl)-2-t-butylaminoethanol hydrochloride (M.P. 248–249° C.) and 95 parts of mannitol is filled into hard gelatine capsules, which are then suitable for oral administration for therapeutic purposes.

*Example 22*

A mixture of 2 parts of aluminium stearate and 98 parts of arachis oil is gelled and sterilised by stirring and heating at 150° C. The mixture is then cooled, 1 part of sterile 1-(2-chromanyl)-2-t-butylaminoethanol hydrochloride (M.P. 248–249° C.) is added, and the mixture is ball-milled under sterile conditions to reduce the particle size of the active ingredient to below 50 microns. The resulting sterile, oily suspension is suitable for intramuscular injection.

What we claim is:

1. A compound selected from amine derivatives of the formula:

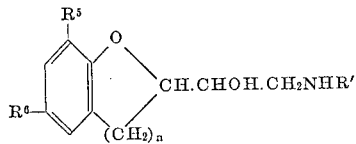

wherein R' is selected from hydrogen, alkyl of 2 to 5 carbon atoms and alkyl of 2 to 5 carbon atoms substituted by at least one radical selected from the group consisting of hydroxy, alkoxy of 1 to 3 carbon atoms, phenyl, halophenyl, hydroxyphenyl, phenoxy, halophenoxy and hydroxyphenoxy and alkoxyphenyl and alkoxyphenoxy each of 7 to 13 carbon atoms; $n$ is selected from 1 and 2; and $R^5$ and $R^6$ are selected from hydrogen, chlorine and bromine; and the esters thereof with carboxylic acids of the formula $R^2 \cdot COOH$ wherein $R^2$ is selected from alkyl of 1 to 3 carbon atoms and aryl of 6 to 10 carbon atoms; and the non-toxic acid-addition salts thereof.

2. A compound according to claim 1 wherein $R^1$ is selected from isopropyl and t-butyl; $n$ is selected from 1 and 2; $R^5$ and $R^6$ are hydrogen; and the O-acetates and non-toxic acid-addition salts thereof.

3. A compound according to claim 1 selected from 1-(2-chromanyl)-2-t-butylaminoethanol and the acetate and non-toxic acid-addition salts thereof.

4. A compound according to claim 1 selected from 1-(2-chromanyl)-2-isopropylaminoethanol and the non-toxic acid-addition salts thereof.

5. A compound according to claim 1 selected from 1-(2,3-dihydrobenzofuran-2-yl)-2-isopropylaminoethanol and the non-toxic acid addition salts thereof.

6. A non-toxic, acid-addition salt according to claim 1 and selected from the group consisting of the hydrochloride, hydrobromide, phosphate, sulphate, oxalate, lactate, tartrate, acetate, salicylate, citrate, benzoate, naphthoate, o-acetoxybenzoate, adipate, maleate, 1,1'-methylenebis-2-hydroxy-3-naphthoate and the salt with sulphonated polystyrene resin.

References Cited

UNITED STATES PATENTS

| | | | |
|---|---|---|---|
| 3,215,732 | 11/1965 | Stephenson | 260—501 |
| 3,255,249 | 6/1966 | Howe et al. | 260—563 |
| 3,308,021 | 3/1967 | Slatcher | 260—250 XR |
| 3,312,592 | 4/1967 | Chodneker et al. | 260—340.3 XR |

OTHER REFERENCES

Black et al.: The Lancet (August 1962), pp. 311–14.

Dornhorst et al.: The Lancet (August 1962), pp. 314–16.

JOHN D. RANDOLPH, *Primary Examiner.*

WALTER A. MODANCE, *Examiner.*

JOHN M. FORD, *Assistant Examiner.*